Aug. 5, 1958    J. B. POLOMSKI    2,845,817
TRANSMISSION CONTROLS
Filed Jan. 12, 1955    3 Sheets-Sheet 1

Inventor:
John B. Polomski
By: Keith J. Bleue
Atty

Aug. 5, 1958 J. B. POLOMSKI 2,845,817
TRANSMISSION CONTROLS

Filed Jan. 12, 1955 3 Sheets-Sheet 3

Inventor:
John B. Polomski
By: Keith J. Blewer Atty.

United States Patent Office 2,845,817
Patented Aug. 5, 1958

2,845,817

TRANSMISSION CONTROLS

John B. Polomski, Detroit, Mich., assignor to Borg-Warner Corporation, Chicago, Ill., a corporation of Illinois Application January 12, 1955, Serial No. 481,363

18 Claims. (Cl. 74—645)

My invention relates to transmissions for automotive vehicles and more particularly to hydraulic controls for such transmissions.

My invention contemplates the use of a transmission, the power trains through which are completed by fluid pressure operated friction engaging devices such as clutches or brakes. It has been common with such transmissions to apply an engaging pressure to the clutches or brakes which is sufficient to prevent slippage of the clutches or brakes under the full power of the vehicle engine; however, under these conditions, the initial engagement has caused a jar or jerk to be given to the vehicle, noticible to the vehicle driver. It is an object of the present invention to provide means for initially engaging the friction brakes and clutches with a much lower pressure than is required for maintaining them from slipping under full engine torque, and, for this purpose, it is an object of the present invention to provide mechanism for maintaining the pressure on apply pistons for the engaging devices at a relatively low value in neutral condition of the transmission which pressure is utilized for initially engaging the friction devices. In this connection, it is also an object to provide means for delaying the eventual increase in fluid pressure applied to the friction engaging devices until they have been completely engaged for completing respective power trains through the transmission. Such a delay device may take the form of a fluid pressure accumulator.

A transmission as presently contemplated may utilize a hydraulic torque converter for completing, in connection with various friction engaging devices, power trains through the transmission, and a direct drive clutch completing a direct drive through the transmission exclusive of the hydraulic torque converter. A fluid pressure operated piston for applying the friction clutch, as well as the other parts of the clutch, may be in the same housing as the bladed elements of the torque converter, and it is an object of the present invention to provide means for decreasing the pressure in the torque converter when application of pressure is made to the direct drive clutch piston to render the pressure necessary for engaging the direct drive clutch less than would be the case if the full pressure of the torque converter had to be overcome.

It is also an object of the present invention to provide means for delaying the disengagement of friction engaging mechanisms completing reverse and forward drive power train respectively, so that when changes are made between forward and reverse, there is an overlapping engagement of the friction devices for the reverse and forward power trains of short duration, which prevents certain parts of the transmission from beginning rotation at undue speeds.

The invention consists of the novel constructions, arrangements and devices to be hereinafter described and claimed for carrying out the above-stated objects and such other objects, as will appear from the following description of a preferred form of the invention, illustrated with reference to the accompanying drawings, wherein:

Like characters of reference designate like parts in the several views.

Figure 1A:
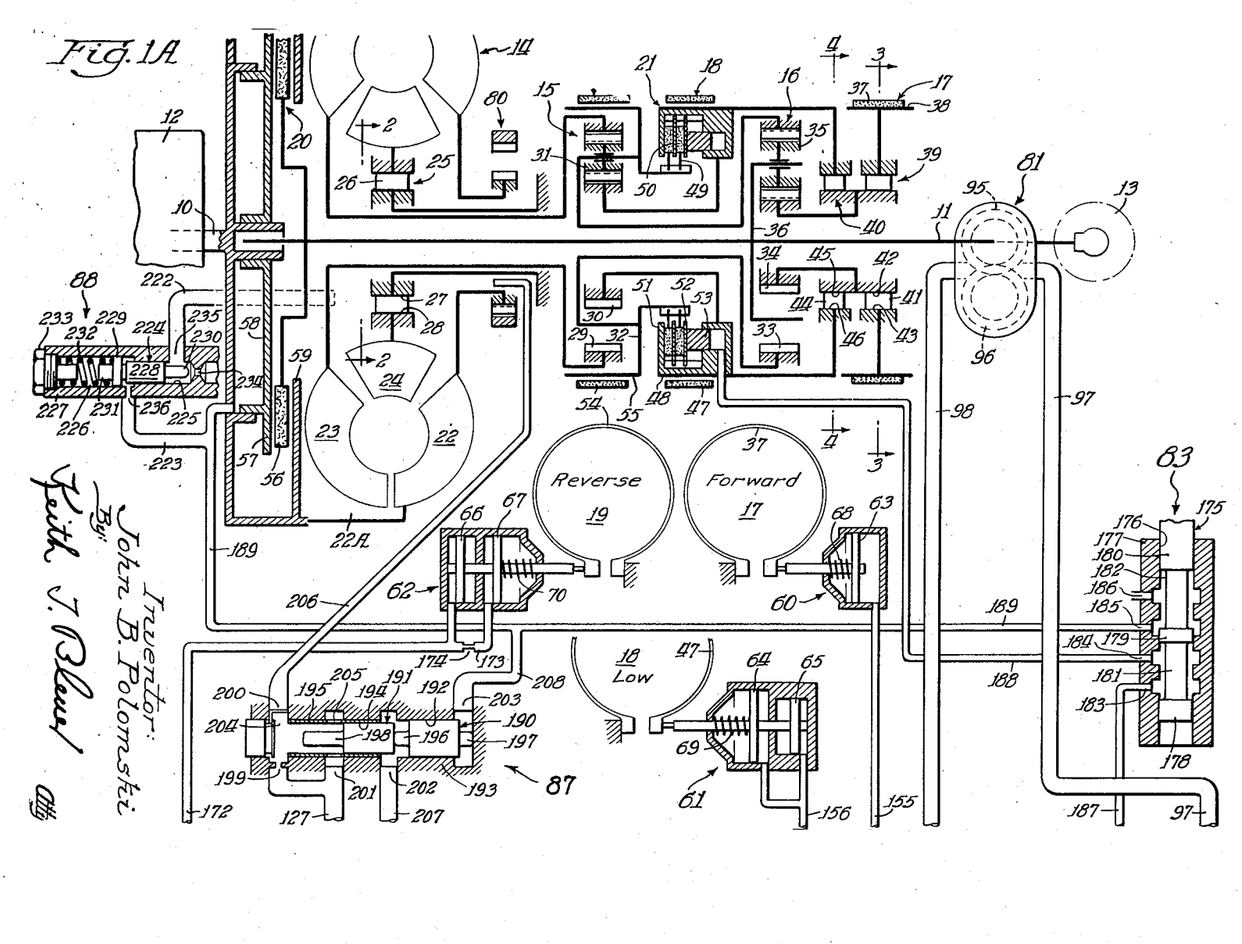
Figs. 1A and 1B, when placed together with Fig. 1A on the top and Fig. 1B below, show a schematic illustration of the transmission with which my improved controls may be used and also a diagrammatic illustration of the improved controls.
Figure 1B:
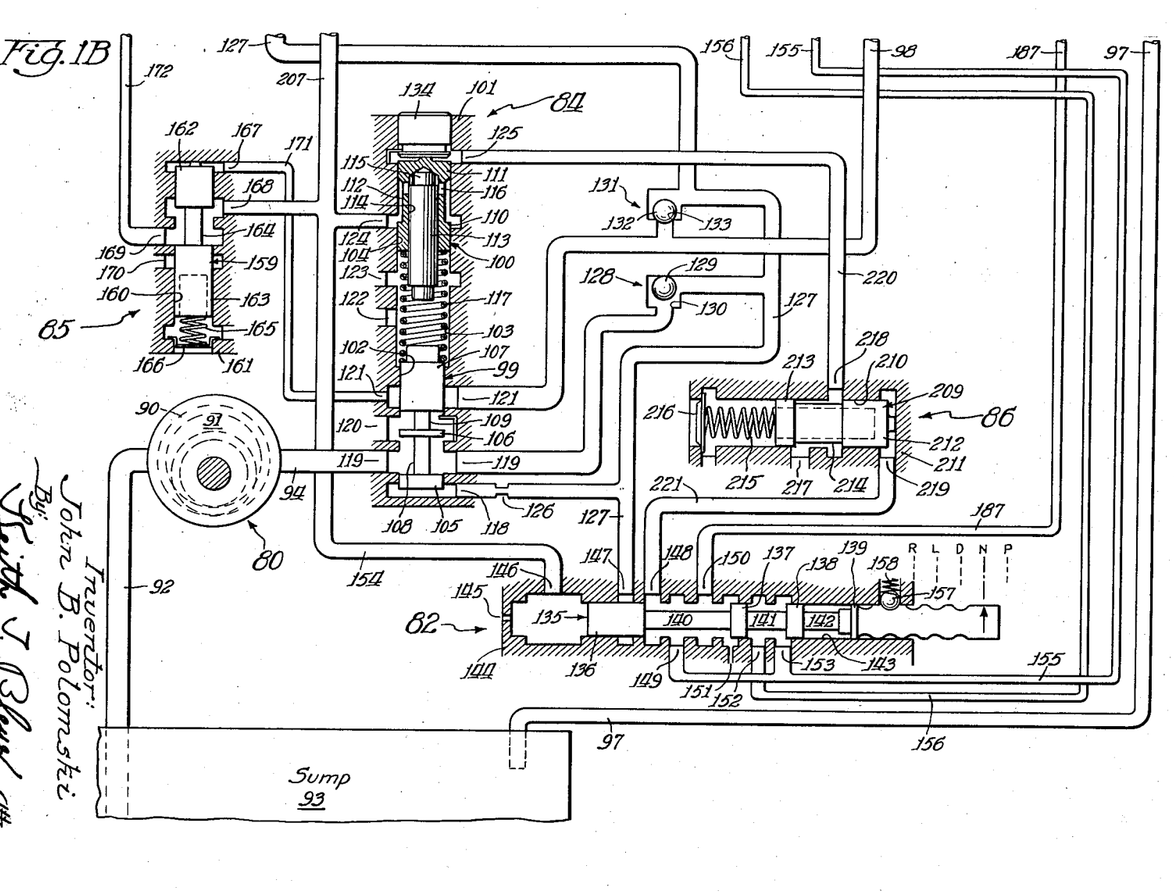

Referring now to the drawing, the transmission illustrated comprises a drive shaft 10 and a driven shaft 11. The drive shaft 10 is adapted to be driven by the engine 12 of the vehicle in which the transmission is installed, and the driven shaft 11 is adapted to drive the rear road wheels 13 of the vehicle through any suitable drive connections.

The transmission comprises, in general, a hydraulic torque converter 14, a planetary gear set 15, a second planetary gear set 16, a forward drive brake 17, a low speed lockup brake 18, a reverse brake 19, a high speed forward drive clutch 20, and an intermediate speed clutch 21.

Figure 2:
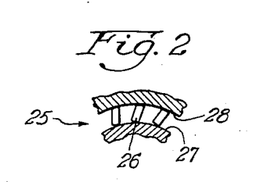
Figs. 2, 3 and 4 are sectional views taken respectively on lines 2—2, 3—3 and 4—4 of Fig. 1 in the directions indicated.

The hydraulic torque converter 14 comprises a bladed impeller 22, a bladed runner or driven element 23, and a bladed stator or reaction element 24. The impeller is connected to be driven from the drive shaft 10. The stator 24 is connected with a one-way brake 25 which is effective for holding the stator 24 against rotation in the reverse direction, that is, in the direction of rotation opposite to that of the drive shaft 10. The brake 25 may be of any suitable construction and may, for example, comprise tiltable sprags 26 disposed between and engageable with inner and outer cylindrical raceways 27 and 28 as shown in Fig. 2.

The planetary gear set 15 comprises a ring gear 29, a sun gear 30, a plurality of planet gears 31, and a planet gear carrier 32 for the planet gears 31. The second planetary gear set 16 comprises a ring gear 33, a sun gear 34, a plurality of planet gears 35 in mesh with the sun and ring gears, and a planet gear carrier 36. The ring gear 29 of the first planetary gear set is connected to be driven by the runner 23 of the torque converter 14, and the planet gear carrier 32 of this gear set is connected with the ring gear 33 of the second planetary gear set 16. The planet gear carrier 36 of the second gear set is connected with the driven shaft 11.

Figure 3:
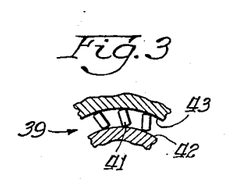
Figure 4:
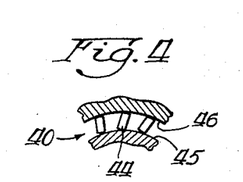

The friction brake 17 comprises a brake band 37 engageable with a drum 38. The brake 17 is effective through a one-way brake 39 for braking the sun gear 34 and is effective through a second one-way brake 40, as well as the first one-way brake 39 disposed in series with the brake 40, for braking the sun gear 30. The one-way brakes 39 and 40 may be of any suitable well-known construction and may be of the sprag type similar to the brake 25. The one-way brake 39 comprises sprags 41 engageable with inner and outer cylindrical surfaces 42 and 43, and the brake 40 comprises sprags 44 engageable between inner and outer cylindrical surfaces 45 and 46. Looking in the same direction at the brakes 39 and 40, the sprags of the two brakes are disposed in opposite directions between the inner and outer races as is apparent from Figs. 3 and 4. The brake 18 comprises a brake band 47 engageable on a brake drum 48 for augmenting the braking action of the one-way brakes 39 and 40 and the friction brake 17 on the sun gear 30. The friction clutch 21 comprises discs 49 rotatable with the planet gear carrier 32, discs 50 rotatable with the sun gear 30, opposite pressure plates 51 and 52, and a fluid pressure actuated piston 53 for moving the plate 52 toward the plate 51 to frictionally engage the two sets of friction discs with each other for engaging the clutch 21.

Figure 5:
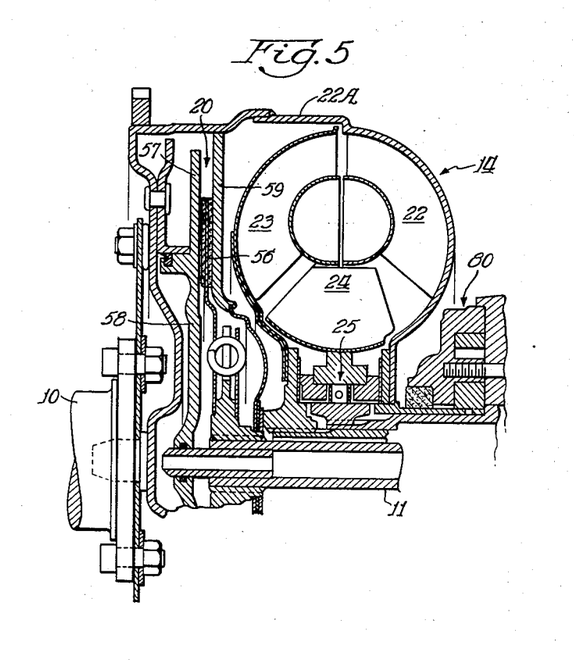
Fig. 5 is a fragmentary, longitudinal, sectional view of the front part of the transmission including a hydraulic torque converter and friction clutch assembly.

The reverse brake 19 comprises a brake band 54 engageable with a drum 55 connected with the carrier 32 of the planetary gear set 15 and the ring gear 33 of the planetary gear set 16. The clutch 20 comprises a clutch disc 56 connected with the driven shaft 11, an axially movable pressure plate 57 having a fluid pressure actuated piston portion 58, and an axially stationary pressure plate 59, both plates being rotatable with the drive shaft 10 and engaging the disc 56 between them. The plates 57 and 59 and the clutch disc 56 are all in the torque converter fluid housing 22A in which the elements 23 and 24 are also disposed, the housing 22A being formed by the impeller 22 (see Fig. 5). As is apparent, the piston 58 is moved in a direction to engage the disc 56 between the plates 57 and 59 by the application of fluid pressure to the front face of the piston portion 58, and the pressure plate 57 moves against the pressure present in the fluid housing 22A.

Each of the brakes 17, 18 and 19 is engaged by a fluid pressure actuated servo-motor, the brakes 17, 18 and 19 being respectively engaged by servo-motors 60, 61 and 62. The servo-motor 60 comprises a fluid actuated pressure piston 63 for engaging the brake band 37 on the drum 38; the servo-motor 61 comprises fluid pressure actuated pistons 64 and 65 for engaging the brake band 47 on the drum 48; and the servomotor 62 comprises pistons 66 and 67 for engaging the brake band 54 on the drum 55. Return springs 68, 69 and 70 are provided in the motors 60, 61 and 62, respectively, for disengaging the bands from the drums.

The transmission is considered sufficiently illustrated herein for a person skilled in the art for the purposes of the present invention which lies in controls for the transmission; however, if further details of the transmission itself are desired, my copending application, Serial No. 189,164, filed October 9, 1950, for "Transmission" may be referred to.

In operation, the transmission provides low, intermediate and direct forward speed drives and a drive in reverse. The transmission, when the clutches 20 and 21 and the brakes 17, 18 and 19 are all engaged, is in a neutral condition, and the shaft 11 is not driven from the shaft 10, the latter being driven by the engine 12. The low speed forward drive may be completed by engaging the brakes 17 and 18. The sun gear 34 is braked by means of the friction brake 17 and the one-way brake 39 from rotation, and the sun gear 30 is braked by the friction brake 18 and the one-way brake 40 from the sun gear 34. The runner 23 of the torque converter 14 is driven through the medium of the fluid in the torque converter from the impeller 22 and the drive shaft 10, and the runner 23 drives the ring gear 29 of the gear set 15. The torque converter 14 is of well known construction and operation, driving the runner 23 at an increased torque at low speeds of the runner and acting as a simple two element fluid coupling at higher runner speeds. The one-way brake 25 holds the reaction element 24 stationary when there is torque conversion but allows it to rotate freely in the forward direction when the hydrodynamic device 14 functions as a fluid coupling. The sun gear 30 of this gear set is braked to be stationary, as has just been described, and the planet gears 31 planetate between the sun gear 30 and the ring gear 29 to drive the carrier 32 at a reduced speed and increased torque in the forward direction. The ring gear 33 of the second planetary gear set 16 is connected with the planet gear carrier 32 and is driven thereby. The sun gear 34 of the gear set 16 is braked to be stationary, as has just been described, and the planet gears 35 of this gear set planetate between the ring gear 33 and the sun gear 34 and drive the planet gear carrier 36, which is connected with the driven shaft 11, at a further reduced speed and increased torque in the forward direction. The driven shaft 11 is thus driven at an increased torque with respect to that impressed on the drive shaft 10, an increase in torque taking place in each of the hydraulic torque converter 14, the planetary gear set 15, and the planetary gear set 16.

Intermediate speed forward drive through the transmission is completed by disengaging the brake 18 and engaging the clutch 21, allowing the forward drive brake 17 to remain engaged. The clutch 21 connects together the planet gear carrier 32 and the sun gear 30 of the planetary gear set 15, thereby locking up the gear set 15 and causing all of its elements to rotate together as a unit. The ring gear 33 of the second planetary gear set 16 is thereby driven from the runner 23 at the same speed at the runner, and the speed of the driven shaft 11 is thereby increased with respect to its speed in low speed forward drive.

Direct drive through the transmission is completed by engaging the clutch 20 which directly connects together the drive shaft 10 with the driven shaft 11. Both the clutch 21 and the brake 17 may be allowed to remain in engaged condition for this drive.

Reverse drive is completed through the transmission by engaging the reverse brake 19. The brake 19 functions to hold stationary the planet gear carrier 32 of the gear set 15 and the ring gear 33 of the gear set 16 connected with the carrier 32. The ring gear 29 is driven as in the forward drives through the hydraulic torque converter 14 from the drive shaft 10, and the sun gear 30 is driven in the reverse direction through the intermediary of the planet gear pinions 31 held against planetary rotation about the centers of the shafts 10 and 11 by the brake 19. The sun gear 30 drives the sun gear 34 of the planetary gear set 16 through the one-way brake 40 which now functions as a clutch. The ring gear 33 of the gear set 16, being held stationary by the reverse brake 19, functions as the reaction element of the gear set 16 to cause a drive of the planet gear carrier 36 and thereby the driven shaft 11 in the reverse direction at a speed which is reduced below the speed of the sun gear 30 due to the action of the planet gear pinions 35 planetating within the ring gear 33.

The control mechanism for the transmission comprises, in general, a pump 80 driven by the drive shaft 10 of the transmission, a pump 81 driven by the driven shaft of the transmission, a manual selector valve 82, a direct drive shift valve 83, a main relief and anti-bump valve 84, a reverse interlock valve 85, an accumulator 86, a converter shuttle valve 87, and a main shaft relief valve 88.

The drive shaft pump 80 comprises an inner gear 89 driven through the intermediary of the impeller 22 of the torque converter 14 from the drive shaft 10 and an outer gear 90 eccentrically located with respect to the inner gear 89 and in mesh with the latter gear. A crescent shaped casing portion 91 separates the gears 89 and 90, as shown. The pump 80 is connected with an inlet conduit 92 and thereby with a fluid sump 93, and the pump is also connected with an outlet conduit 94. The pump is of a well-known construction and operates, as is well understood, to pump fluid from the conduit 92 to the conduit 94 when the inner gear 89 is rotated in the direction indicated by the arrow on the gear and the outer gear 90 rotates in the same direction due to its meshing engagement with the gear 89, the pumping action being due to the fluid carried by the gears 89 and 90 across the inner and outer faces of the crescent shaped casing portion 91.

The driven shaft pump 81 comprises a gear 95 driven by the driven shaft 11 in mesh with a gear 96. The pump 81 is connected with an inlet conduit 97 which is connected to draw fluid out of the sump 93, and the pump is connected with an outlet conduit 98. The pump 81 also is of well-known construction and operation, carrying the fluid between its gear teeth to provide its pumping action.

The outlet conduit 94 of the drive shaft pump is connected with the main relief and anti-bump valve 84, as shown. The valve 84 comprises pistons 99 and 100 slidably disposed in a casing portion 101. The casing portion 101 is provided with three connected cylindrical cavities 102, 103 and 104 of successively increasing diameters, and the piston 99 is slidably disposed in the cavity 102, and the piston 100 is slidably disposed in the cavity 104. The piston 99 has lands 105, 106 and 107 and grooves 108 and 109 between the lands. The piston 100 has lands 110 and 111 and a groove 112 between the lands. A piston 113 is slidably disposed within a cylindrical cavity 114 within the piston 100 and has a relatively small diameter end 115 to abut the upper end of the cavity 114, the end 115 being in communication with ports 116 provided in the piston 100. A compression spring 117 is provided between the piston 100 and the piston 99.

The casing portion 101 is provided with ports 118, 119, 120, 121, 122, 123, 124 and 125, the ports 119 and 121 being in pairs. The port 118 is connected through a restriction 126 with a line pressure conduit 127. One of the ports 119 is connected with the discharge side of the pump 80, and the other port 119 is connected through a check valve 128 with the conduit 127. The check valve 128 comprises a ball 129 adapted to seal on a seat 130. The port 120 is a bleed port freely discharging into the sump 93. One of the ports 121 is connected through a check valve 131 with the line pressure conduit 127, the check valve 131 comprising a ball 132 adapted to rest and seal on a seat 133. The ports 122 and 123 are bleed ports freely discharging into the sump 93. A plug 134 seals the cavity 104 at its upper end.

The selector valve 82 comprises a piston 135 having lands 136, 137, 138 and 139 separated by grooves 140, 141 and 142. The piston 135 is slidably disposed in a cylindrical cavity 143 provided in a valve body 144. The cavity 143 is provided with ports 145, 146, 147, 148, 149, 150, 151, 152 and 153. The ports 145 and 151 are both restricted ports, and both are bleed ports discharging into the sump 93. The port 146 is connected by means of a conduit 154 with the port 124 in the valve 84. The port 147 is connected to the line pressure supply conduit 127. The ports 149 and 153 are connected by means of a conduit 155 with the servo-motor 60 for the forward drive brake 17. The port 152 is connected by means of a conduit 156 with the servo-motor 61 for the low speed forward drive brake 18.

A detent comprising a ball 157 acted on by a spring 158 is provided for yieldably holding the piston 135 in a number of different operative positions which are labeled P, N, D, L, R respectively corresponding to parking, neutral, drive, low and reverse conditions of the transmission. A notch is provided in the exterior surface of the piston 135 corresponding to each of these positions of the piston, the ball 157 fitting into the notches to hold the piston 135 in its respective positions.

The servo-motor 62 for the reverse brake 19 is connected through the reverse interlock valve 85 with the conduit 154. The reverse interlock valve 85 comprises a piston 159 slidably disposed in a cylindrical cavity 160 provided in a valve body 161. The piston 159 is provided with lands 162 and 163 separated by a groove 164. A spring 165 is provided between the right end of the piston 159 and a spring retainer 166 fitting in the right end of the valve body 161.

The valve body 161 is provided with ports 167, 168, 169 and 170. The port 167 is connected by means of a conduit 171 with the port 121 of the valve 84; the port 168 is connected with the conduit 154; the port 169 is connected by means of a conduit 172 with the servo-motor 62, the connection with the piston 66 being through a parallel branch conduit 173 having a restriction 174 therein; and the port 170 is a bleed port adapted to freely discharge into the sump 93.

The selector valve 82 is adapted to supply fluid under pressure to the direct drive shift valve 83. The valve 83 comprises a piston 175 slidably disposed in a cylindrical cavity 176 provided in a valve body 177. The piston 175 is formed with lands 178, 179 and 180 separated by grooves 181 and 182. The valve body 177 is provided with ports 183, 184, 185 and 186. The port 183 is connected by means of a conduit 187 with the port 150 of the selector valve 82; the port 184 is connected by means of a conduit 188 with the piston 53 of the intermediate speed clutch 21; the port 185 is connected by means of a conduit 189 with the piston 58 of the direct drive clutch 20; and the port 186 is a bleed port adapted to freely discharge into the sump 93.

No particular mechanism is shown for shifting the direct drive shift valve 83, it being understood that any suitable means, either automatic or manual, may be provided for such a purpose.

The torque converter 14 is provided with fluid for maintaining the torque converter operative through the converter shuttle valve 87 from the conduit 127. The converter shuttle valve 87 comprises a piston 190 and a piston 191. The piston 190 is slidably disposed in a cylindrical cavity 192 provided in a valve body 193; and the piston 191 is slidably disposed in a cylindrical cavity 194 of a bushing 195 fixed within the cavity 192, as shown. The piston 190 is provided with reduced diameter end portions 196 and 197, and the piston 191 is provided with a reduced diameter end portion 198. The valve body 193 is provided with ports 199, 200, 201, 202 and 203. The bushing 195 is provided with a passage 204 extending therethrough and connecting the ports 199 and 200 and is provided with ports 205 in communication with the port 201. The port 199 is a restricted port as shown, and the ports 205 in the bushing 195 are also restricted ports but are somewhat larger than the restricted port 199.

The ports 199 and 201 connect with the line pressure supply conduit 127; the port 200 is connected with the torque converter 14 for supplying fluid under pressure to the torque converter by means of a conduit 206; the port 202 is connected by means of a branch conduit 207 with the conduit 154; and the port 203 is connected by means of a branch conduit 208 with the conduit 189 leading to the engaging piston 58 for the direct drive clutch 20.

The port 125 of the main relief valve 84 is connected with the port 148 of the selector valve 82, the connection being through the accumulator 86. The accumulator 86 comprises a piston 209 slidably disposed in a cylindrical cavity 210 provided in a valve body 211. The piston 209 is provided with lands 212 and 213 separated by a groove 214. A compression spring 215 is provided between the left end of the piston 209 and a spring retainer 216 fitting in the left end of the cavity 210.

The valve body 211 is provided with ports 217, 218 and 219. The port 217 is a bleed port adapted to freely discharge into the sump 93; the port 218 is connected by means of a conduit 220 with the port 125 of the main relief valve 84; and the port 219 is connected with the port 148 of the selector valve 82 by means of a conduit 221.

The main shaft valve 88 is connected with the outlet conduit 222 of the converter 14 and is connected also, by means of a branch conduit 223, with the conduit 189 supplying fluid pressure to the piston 58 for the direct drive friction clutch 20. The valve 88 comprises a valve piston 224 slidably disposed in connected cylindrical cavities 225 and 226 formed in a body portion 227. The valve piston 224 comprises lands 228 and 229 and reduced diameter end portions 230 and 231. A compression spring 232 is disposed between the land 229 and a plug 233 closing the cavity 226. The spring 232 fits over the reduced end portion 231 of the valve piston 224, as shown.

The body portion 227 is provided with ports 234, 235 and 236. The port 234 is connected to discharge fluid into the sump 93 and is adapted to be closed more or less by the piston 224, particularly by the end portion 230, depending on the position of the piston within the cavities 225 and 226. The port 235 is connected to the conduit 222, and the port 236 is connected to the conduit 223. The port 236 is also a restricted port, as shown.

In the "N" and "P" positions of the selector valve piston 135, the land 136 on the piston 135 blocks the pressure supply port 147. Assuming that the vehicle engine is in operation, the pump 80 driven through the impeller 22 of the torque converter 14 pumps fluid from the sump 93 through the conduit 92 into the conduit 94. The fluid in the conduit 94 proceeds through the connected ports 119 and moves the ball 129 off its seat 130 to provide fluid under pressure within the pressure supply conduit 127 connected with the port 147. The selector valve piston 135 thus blocks application of fluid pressure to any of the fluid pressure applied brakes or clutches and maintains the transmission in neutral condition with none of the power trains through the transmission completed.

The pressure of the fluid in the conduit 127 is maintained at a predetermined maximum, which is some relatively low pressure such as 20 lbs. per sq. in. with the selector valve piston being in its "N" or "P" position, due to the action of the piston 99 in the main relief valve 84. The fluid under pressure in the conduit 127 is applied to the lower side of the valve land 105 through the restriction 126, and this fluid pressure functions to move the piston 99 upwardly against the action of the spring 117 so as to provide an egress for the fluid from the conduit 94 between the land 106 and the lower edge of the port 120 of the valve 84. A greater fluid pressure will tend to move the valve piston 99 farther upwardly to relieve a greater amount of fluid pressure between the land 106 and the lower edge of the port 120, while a lower fluid pressure will allow the spring 117 to move the piston 99 downwardly to close the crack between the land 106 and the lower edge of the port 120 to reduce the release of fluid from the conduit 94, the net result being a stabilization of the fluid pressure within the conduit 127 at a predetermined maximum by means of the valve piston 99. The piston 100 in the valve 84 under these conditions remains at its uppermost position in which it contacts the plug 134 of the valve 84.

The converter shuttle valve 87 and the converter relief valve 88 function to maintain a predetermined pressure within the torque converter 14, such as 15 lbs. per sq. in. with selector valve piston 135 being in its "N" or "P" position. The ports 199 and 201 of the valve 87 are permanently connected with the line pressure supply conduit 127, and fluid flows through the ports 199 and 201 into the valve 87. The fluid from the restricted port 199 flows through the slot 204 in the sleeve 195 to the port 200 and conduit 206, and the fluid supplied to the port 201 proceeds in a parallel path through the restricted ports 205 in the sleeve 195, around the reduced diameter end 198 of the valve piston 191, through the sleeve 195 and its slot 204 to the port 200 and the conduit 206. The pistons 190 and 191 remain at the limit of their movement to the right within the cavities 192 and 194.

The fluid flowing through the conduit 206 flows into and through the torque converter 14 and into the torque converter exit conduit 222. The fluid in the conduit 222 acts on the right end of the piston 224 and moves the piston to the left against the action of the spring 232, so that the reduced end portion 230 of the piston 224 moves to open the restriction 234 with respect to the conduit 222, allowing the fluid flowing from the torque converter to escape. The fluid flowing through the restriction 234 may then be used for lubricating various parts of the transmission. The restrictions 199 and 205 function to restrict the amount of fluid that can flow into the torque converter, and the valve 88 allows only a sufficient amount of fluid to escape from the torque converter for maintaining the predetermined maximum converter pressure.

The valve piston 135 is moved into its "D" position for conditioning the transmission for a drive in intermediate speed ratio with a subsequent automatic upshift to direct drive. The selector valve piston 135 in its "D" position opens the port 147 connected with the line pressure supply conduit 127 and connects the ports 148, 149 and 150 with the supply port 147. As has been previously described, during neutral and park conditions, the main relief valve 84 maintains pressure in the conduit 127 at some relatively low value, such as 20 lbs. per sq. in., and this value of fluid pressure is utilized for engaging the forward brake 17 and the multiple disc clutch 21. This relatively low value of fluid pressure in the fluid supply conduit 127 is just sufficient to engage the clutch 21 and brake 17 to hold the engaging parts again the drag torque transmitted through the hydraulic torque converter 14 and to stop the engaging parts from rotation relative to each other due to inertia of the parts of the transmission, assuming that the vehicle accelerator is in a released closed throttle position. Since this low value of engaging pressure is used, the engagement of the brake 17 and clutch 21 is gradual and without jerk so that the engagement is not noticeable to the vehicle driver.

This reduced fluid pressure is supplied from the supply port 147 to the port 149 and flows through the conduit 155 to the servomotor 60 and acts on the piston 63 of the servomotor to engage the brake band 37 on the drum 38 of the brake 17. The fluid under this relatively low pressure flows through the port 150, the conduit 187, the groove 181 of the valve piston 175, the port 184 and the conduit 188 to the piston 53 of the multiple disc clutch 21 for engaging the clutch 21. The fluid pressure also flows from the supply port 147 through the port 148, the conduit 221 and the port 219 to the right end of the valve piston 209 of the accumulator 86. This fluid pressure behind the piston 209 gradually moves the piston 209 to the left against the action of the spring 215 to finally connect the port 218 with the port 219. The pressure then flows from the port 218 through the conduit 220 and the port 125 and acts on the piston 100 of the relief valve 84. The fluid pressure moves the piston 100 downwardly against the action of the spring 117 until the piston strikes the upper edge of the relatively small diameter cavity 103 at the lower edge of the port 123 to prevent its further movement. The spring 117 is thus compressed and acts on the piston 99 so as to tend to move the piston 99 downwardly in the cavity 102 to close the port 120 by means of the land 106. The pressure in the conduit 127 and connected conduits must, therefore, build up to a higher value, such as 80 lbs. per sq. in., in order that it may be effective to move the valve piston 99 upwardly again into its fluid pressure regulating position, cracking open the port 120.

The valve piston 99 regulates the pressure in the supply conduit as before, but, due to the action of the piston 100 compressing the spring 117, the pressure in the conduit is at the higher value, such as 80 lbs. per sq. in., which is sufficient to maintain the clutch 21 and the brake 17 engaged with sufficient intensity, so that there is no slippage as the engine throttle is opened and greater power is transmitted by the vehicle engine with torque conversion in the torque converter 14. Due to the effect of the accumulator 86, this build up in pressure from the low pressure value of 20 lbs. per sq. in. to the higher pressure value of 80 lbs. per sq. in. does not take place immediately but does take place after the initial completion of the intermediate speed power train has taken place and the engaging parts of the clutch 21 and the brake 17 have lost their relative movement with respect to each other, which is caused by drag torque through the torque converter 14 and the inertia of the rotating parts of the transmission. As is apparent, this delay is due to the fact that the piston 209 is moved against the action of the spring 215 an appreciable distance by the fluid pressure from the conduit 127 applied to the piston 209.

With the pressure in the conduit 127 being at its 80 lbs. per sq. in. value sufficient for completing the power train through the transmission with the engine 12 supplying torque under open throttle condition, the pressure within the torque converter 14 is coordinately increased to a value sufficient for transmitting the increased engine torque through the converter 14. The fluid flowing through the restricted ports 199 and 205 of the converter shuttle valve 87 increases with the increased line pressure in conduit 127, and the valve 88 opens farther to pass the increased flow through the converter. The latter valve provides such an impediment to the fluid flow, however, to cause the torque converter pressure to increase and be maintained at a relatively high value, which may be 55 lbs. per sq. in. in a particular embodiment.

The transmission is shifted into direct drive by moving the shift valve piston 175 so that its groove 181 bridges the ports 183, 184 and 185, instead of only the ports 183 and 184. The fluid pressure in the conduit 187 thus flows through the port 183, the groove 181, the port 185, the conduit 189 to the piston 58 of the direct drive friction clutch 20, and the clutch 20 is thus engaged, completing direct drive through the transmission. The multiple disc clutch 21 and the forward brake 17 remain engaged, but, under direct drive conditions, they carry no torque.

The main relief valve 84 remains in the same condition in direct drive as for intermediate speed drive with the piston 100 resting on the upper end of the cavity 103 so as to maintain the fluid pressure in the supply conduit 127 at the same pressure of 80 lbs. per sq. in., and this 80 lb. pressure is applied on to the clutch 20 for engaging it. In order that the clutch 20 may completely engage, however, the pressure in the torque converter 14 is reduced, this being the function of the converter shuttle valve 87 and the converter relief valve 88 as will now be described. The port 203 of the converter shuttle valve 87 is connected by means of the conduit 208 with the conduit 189 supplying fluid pressure to the direct clutch 20, and fluid pressure for direct drive is thus applied on to the right end of the valve piston 190 of the shuttle valve 87, thus moving the pistons 190 and 191 to the limit of their movement to the left with the reduced end portion 198 of the piston 191 contacting the closed end of the cavity 194 in the sleeve 195. The piston 191 under these conditions closes the restricted ports 205, and the converter 14 is supplied now only through the restricted port 199, so that the supply of fluid through the converter is reduced.

The converter relief valve 88 is also connected with the direct clutch supply line 189, the connection being through the branch conduit 223. The pressure in the supply line 189 flows through the conduit 223 and port 236 to the land 229 of the piston 224, moving the piston 224 to the left against the action of the spring 232 so as to completely open the restricted port 234. Fluid flowing through the converter 14 may thus facilely flow through the relief conduit 222. These changed conditions of the valves 87 and 88 result in a reduction of fluid pressure within the converter 14 from 55 lbs. per sq. in. to 30 lbs. per sq. in. in the particular embodiment of the invention above referred to. It will be observed that the friction clutch 20 and its actuating piston 58 are in the same fluid housing as the bladed elements of the torque converter 14, and the clutch engaging piston 58 in its clutch engaging movement must act against the fluid pressure in the torque converter. Since the torque converter in direct drive is not in use for transmission of torque, it is advantageous to reduce the pressure in the torque converter so that the clutch 20 may be more quickly and more securely engaged. Incidentally, it is, in general, necessary to have the higher fluid pressure in the torque converter 14 when there is actually a drive through the torque converter so that this drive may be secured without cavitation noises and undue slip.

A change from direct drive to intermediate speed drive may be obtained by moving the shift valve piston 175 back from its direct drive position in which the groove 181 bridges all three of the ports 183, 184 and 185 into its intermediate speed position in which the groove 181 bridges only the ports 183 and 184. The pressure applied to the direct drive clutch piston 58 is thus relieved through the conduit 189, the port 185, the groove 182 and the port 186, and the clutch 20 is disengaged. The fluid pressure applied through the conduit 223 to the converter relief valve 88 and the fluid pressure applied through the conduit 208 to the converter shuttle valve 87 are simultaneously relieved, so that these valves return to their intermediate drive conditions returning the torque converter fluid pressure to its higher value of 55 lbs. per sq. in the particular embodiment mentioned. This increased fluid pressure in the converter is necessary on this ratio change not only for the purpose of providing adequate torque capacity in the torque converter 14 but also for the purpose of moving the clutch piston 58 back from its clutch engaged position into its clutch released position.

The transmission is changed into its low speed ratio by moving the manual selector valve piston 135 into its "L" position. In this position, a groove 140 of the piston 135 connects the ports 147, 148 and 149. The forward brake 17 remains engaged as before due to fluid flow through the port 149, and the line pressure in the conduit 127 is at its high value of 80 lbs. per sq. in. due to the application of pressure on the piston 100 of the main relief valve 84 through the port 148, the same as in the higher speed ratios. In the "L" position of the piston 135, the groove 141 of the valve piston connects the ports 153 and 152. The fluid pressure in the conduit 155 thus flows through the port 153, the groove 141, the port 152 and the conduit 156 to the pistons 65 and 64 of the servomotor 61 for engaging the low speed lock up brake 18. The transmission is thus in low speed drive.

In all three forward speed drives, the pump 81, when it increases in speed sufficiently with corresponding increases in speed of the driven shaft 11 of the transmission and of the vehicle as a whole, takes over the supply of the fluid system of the transmission, and the pump 80 is dumped into the sump 93. As the pressure from the driven shaft pump 81 increases, it eventually overcomes the pressure from the drive shaft pump 80 and moves the ball 132 off the seat 133. The fluid from the driven shaft pump 181 thus slightly increases the pressure in the supply conduit 127 and moves the valve piston 99 slightly upwardly so as to move the land 106 out of fluid pressure regulating position with the upper edge of the port 120 and completely dumping the output of the front pump 80 through the port 120 and groove 108. This upward movement causes a cracking to occur between the lower edge of a port 121 and the lower edge of the valve land 107, so that these edges thereafter function to regulate the pressure in the conduit 127 at a maximum predetermined pressure, which is slightly higher than that which the valve 84 maintains when the drive shaft pump 80 supplies the pressure, the valve 84 by means of land 107 regulating the same as the land 106 prior to the pump 81 attaining a substantial output, and dumping excess fluid to the sump 93 through the groove 109 and port 120.

The transmission is conditioned for reverse drive by moving the selector valve piston 135 into its "R" position. In this position, the groove 140 of the valve piston 135 connects the ports 146, 147 and 148. Line pressure is thus supplied through the port 148 and conduit 221 to the accumulator 86 and from thence to the piston 100 of the main relief valve 84 holding the piston 100 against the upper edge of the cavity 103 as has been described in connection with the previous drives. Line pressure is also supplied from the port 147 to the port 146 and through the conduit 154 to the port 124 of the main relief valve 84. This fluid pressure flows through the ports 116 of the piston 100 and is impressed on the upper reduced end 115 of the piston 113, and the piston 113 puts an added force on the regulator piston 99, the force from the piston 113 being in addition to the force from the spring 117. This added force on the regulator piston 99 holds the piston 99 to close the port 120 by means of the land 106 until a higher fluid pressure is reached than is provided for the forward drives, a pressure of 170 lbs. being utilized for reverse drive, for example, in one particular embodiment. When the pressure in the conduit 127 and connected conduits tends to increase above this value, the land 106 moves to open slightly the port 120 and relieve the excess pressure. In reverse drive all of the pressure fluid is obtained from the drive shaft pump 80, since the driven shaft pump 81 is rotating in the reverse direction. Except for providing an increased pressure, the land 106 regulates pressure the same as for the forward drives.

This increased pressure in conduit 127 and connected conduit 154 is supplied through the reverse interlock valve 85 to the servomotor 62 for the reverse brake 19. The fluid under pressure flows through the port 168, the groove 164, the port 169, the conduit 172, the restriction 173 and conduit 174 and conduit 173 to the pistons 66 and 67. The restriction 174 slows the application of fluid pressure to the piston 66 and thus slows the application of the brake 19 to prevent an undue jerk or jar to the vehicle upon engagement of the brake 19. With the resultant engagement of the brake 19, the reverse drive power train through the transmission is completed.

This application of the reverse brake 19 is prevented by the reverse interlock valve 85 when there is any substantial motion of the vehicle in the forward direction. The reverse interlock valve port 167 is connected through the conduit 171, the connected ports 121, and the conduit 98 with rear pump 81, and as long as there is any substantial pressure from the rear pump 81, this pressure acting on the left end of the valve piston 159 holds the vale piston 159 to the limit of its movement to the right against the action of the spring 165, so that the land 162 closes the port 168 and thus prevents any application of fluid pressure to the servomotor 62 for the reverse brake 19.

The pressure in the converter 14 is maintained at substantially the same pressure as for the low and intermediate forward drives, regardless of the fact that the line pressure in the pressure supply line 127 is substantially doubled for reverse drive. The increased line pressure in the line 154 is transmitted through the branch conduit 207 to the port 202 of the converter shuttle valve 87, and this pressure acts against the right end of the piston 191 and moves the piston 191 to the limit of its movement to the left with its reduced end 198 in contact with the end of the cavity 194 of the sleeve 195. The piston 191 thus closes the large restrictions 205 in the sleeve 195, and only the small restriction 199 is effective for supplying fluid to the torque converter 14. The converter relief valve 88 functions similarly as in low and intermediate speed drive, acting to variably stop flow through the restriction 234. The valves 87 and 88 thus cooperate to maintain substantially the same fluid pressure in the torque converter 14 as for low and intermediate speed drives, which is fifty lbs. per sq. in. for the particular embodiment above referred to.

The jet or restriction 151 is provided for the purpose of retarding the disengagement of the low and forward brakes 18 and 17 on a shift from low to reverse drive, and the jet 145 is for the purpose of retarding the disengagement of the reverse brake 19 on a shift from reverse to low drive. The jets 151 and 145 thus provide an overlap of the reverse and low speed power train completing brakes, so that there is no undue increase in speed of elements of the gear set running free in such shifts between low and reverse.

For reverse drive, the conduit 154 is supplied fluid under pressure from the fluid pressure supply conduit 127, and the conduit 154 is connected through the reverse interlock valve with the reverse brake servo-motor 62. When the shift valve piston 135 is moved from its "R" position to its "L" position, the land 136 opens the port 146 for the conduit 154 to the restricted bleed port 145, and fluid under pressure in the servo-motor 62 for the reverse brake 19 is drained through the restricted port 145, which, since it is restricted, delays the disengagement of the reverse brake 19. The low and forward brakes 18 and 17, the servo-motors 61 and 60 of which are supplied fluid under pressure for engaging the brakes through the unrestricted port 149 and associated conduits, engage slightly before the release of the brake 19 and provide an overlap of engagement.

The jet 151 provides a similar action as the jet 145 when the shift is instead from low to reverse. In the "R" position of the valve piston 135, the servo-motors 61 and 60 for the brakes 18 and 17 are drained through the restricted port 151, the port 153 and the port 152 both being connected by means of the groove 142 with the restricted port 151. Therefore, on a movement of the piston 135 from its "L" to its "R" position, the disengagement of the brakes 18 and 17 is retarded due to the restricted port 151 slowing the flow of fluid from the servo-motors 61 and 60 to the sump 93, while the reverse brake 19 is engaged without restriction through the ports 147 and 146 and connected conduits as has been previously described.

My improved transmission controls advantageously provide a relatively small engaging pressure for the fluid pressure operated friction engaging devices for initially engaging these devices to prevent a jar to the vehicle and the driver on engagement, this low fluid pressure being maintained in the system in neutral condition of the system for application to the fluid pressure operated friction engaging devices immediately on a change in drive. The accumulator 86 functions to delay the increase of fluid pressure in the system until the fluid pressure operated friction engaging devices have been fully engaged. The initial engagement of these devices is just sufficient to stop the engaging parts with respect to each other and to overcome the drag torque of the torque converter.

The converter shuttle valve 87 and the converter relief valve 88 advantageously function to decrease the fluid pressure within the converter when the direct drive clutch is engaged to make it possible to engage this clutch with a smaller fluid pressure than would otherwise be possible. The jets or restrictions 151 and 145 in connection with the friction brakes for the low and reverse drives advantageously function to delay the disengagement of these brakes in shifting from low to reverse or vice versa to provide an overlap in the engagement of the brakes, so that parts of the transmission gear sets do not rotate at undue speeds causing a jar upon the eventual stoppage of rotation of these parts.

I wish it to be understood that my invention is not to be limited to the constructions and arrangements shown and described, except only insofar as the claims may be so limited, as it will be understood to those skilled in the art that changes may be made without departing from the principles of the invention.

I claim:

1. In a transmission for an engine driven vehicle, the combination of a drive shaft, a driven shaft, a hydrodynamic coupling device driven by said drive shaft, means for providing a power train between said hydrodynamic device and said driven shaft and including a fluid pressure operated friction engaging device for completing the power train when engaged, a source of fluid pressure, a manually operated selector valve having a neutral position wherein no pressure is connected to said friction engaging device and having a drive position for connecting said pressure source with said friction engaging device, means under the control of said selector valve for causing the pressure of said source to be at an ultimate relatively high predetermined pressure to engage said friction device for completing a vehicle driving power train between said shafts when said selector valve is in its drive position, and means under the control of said selector valve for causing said source to be at a relatively low predetermined pressure at the neutral position of said selector valve so that the initial application of pressure to said friction device when said valve is shifted from its neutral position to its drive position is at said relatively low predetermined pressure at which a soft engagement of said friction device is obtained sufficient for holding the engaging parts of said friction device from relative motion at idling condition of the vehicle engine during which said hydrodynamic coupling device slips.

2. In a transmission for an engine driven vehicle, the combination of a drive shaft, a driven shaft, a hydrodynamic coupling device driven by said drive shaft, means for providing a power train between said hydrodynamic device and said driven shaft including a fluid pressure operated friction engaging device for completing the power train, a source of fluid pressure, a manually operated selector valve having a neutral position wherein no pressure is connected to said friction engaging device and having a drive position for connecting the fluid source with said friction engaging device, means under the control of said selector valve for causing said fluid pressure to be at an ultimately relatively high predetermined pressure for completing a vehicle driving power train between said shafts when the valve is in its drive position, means under the control of said selector valve for causing said fluid to be at a relatively low predetermined pressure in the neutral position of said selector valve, and means for delaying the increase of the pressure of said fluid when said selector valve is moved from its neutral to its drive position so that said friction engaging device is initially applied with said relatively low predetermined fluid pressure at which a soft engagement is obtained sufficient for holding the engaging parts of said device from relative motion at idling condition of the vehicle engine during which said hydrodynamic coupling slips.

3. In a transmission for an engine driven vehicle, the combination of a drive shaft, a driven shaft, a hydrodynamic coupling device driven by said drive shaft, means for providing a power train between said hydrodynamic device and said driven shaft and including a fluid pressure operated friction engaging device for completing the power train, a source of fluid pressure, a selector valve having a neutral position and having a drive position for connecting said fluid pressure source and said device in its drive position, a regulator valve for regulating the pressure of said fluid pressure source and regulating the pressure at a relatively low predetermined pressure when no fluid pressure from said selector valve is applied thereto but regulating the fluid pressure of said source at a relatively high predetermined pressure when fluid pressure from said selector valve is applied to the regulator valve, means for connecting said selector valve and said regulator valve so that said regulator valve maintains said pressure source at its relatively high pressure when said selector valve is in its drive position, and means for delaying the build up of pressure from said relatively low pressure to said high pressure when said selector valve is moved from its neutral to its drive position and including a spring applied accumulator piston having the fluid pressure from said selector valve leading to said regulator valve applied to the accumulator piston, whereby said friction engaging device is initially engaged at said relatively low predetermined pressure after a movement from neutral to drive position of said selector valve at which low pressure a soft engagement of said friction engaging device is obtained sufficient for holding the engaging parts of said friction engaging device from relative motion at idling conditions of the vehicle engine.

4. In a transmission, the combination of a drive shaft, a driven shaft, means for providing a first power train between said shafts and including a hydrodynamic coupling device having driving and driven bladed elements within a fluid housing, means for providing a second alternate power train between said shafts including a clutch and a fluid pressure operated clutch engaging piston in said housing and acting against fluid in the housing to engage the clutch, means for circulating fluid through said hydrodynamic device, means for maintaining the fluid in said housing at a predetermined high pressure when said first power train is completed and including a regulator valve and a spring acting against said valve, said valve being subject to pressure of fluid discharged from said hydrodynamic device and opening in response to the fluid pressure discharged from said hydrodynamic device, and means for reducing the pressure in said housing when said second power train is completed and including means for applying the fluid pressure applied to said clutch engaging piston also to said regulator valve tending to move the regulator valve in a valve opening direction against the action of its spring.

5. In a transmission, the combination of a drive shaft, a driven shaft, means for providing a first power train between said shafts including a hydrodynamic coupling device having a bladed driving element and a bladed driven element within a fluid housing, means for providing a second alternate power train between said shafts including a clutch and a fluid pressure operated piston within said housing acting against the fluid pressure in the housing to engage said clutch, means for circulating fluid through said hydrodynamic coupling device including a fluid inlet to said fluid housing, means for maintaining the fluid in said housing at a certain pressure when said first power train is completed, and means for reducing the pressure in said housing when said second power train is completed and including means forming a restriction in the fluid inlet of said hydrodynamic coupling device, means forming a second relatively unrestricted passage in parallel with said restriction, and a piston subject to the pressure of the fluid applied to said piston for said clutch for closing said parallel passage when clutch engaging fluid pressure is applied to said clutch piston.

6. In a transmission; the combination of a drive shaft; a driven shaft; means providing a first power train between said shafts including a hydrodynamic device having a bladed driving element and a bladed driven element within a fluid housing; means providing a second alternate power train between said shafts including a clutch and a fluid pressure applied piston acting against the fluid in said housing to engage the clutch; means for circulating fluid through said hydrodynamic device including a fluid inlet passage to said fluid housing and an outlet for said housing; means for maintaining the fluid in said housing at a predetermined high pressure when said first power train is completed and including a spring biased regulator valve subject to the fluid pressure output of the hydrodynamic device and opened in accordance with the fluid pressure output; and means for reducing the pressure in said hydrodynamic device when said second power train is completed and including means forming a restriction in parallel with the inlet passage to said hydrodynamic device, a piston subject to the fluid pressure applied to said clutch piston for closing said fluid inlet passage so that the inlet to the torque converter flows through the restriction exclusively, and means for applying the fluid pressure supplied to said first-named piston for engaging said clutch also to said regulator valve tending to move the regulator valve against the action of its spring to further open the outlet of the hydrodynamic device.

7. In a transmission, the combination of a drive shaft, a driven shaft, a source of fluid pressure, valve means for selectively changing the pressure of said fluid between certain low and high pressures, means for providing a power train between said shafts including a hydrodynamic coupling device, a conduit for connecting said hydrodynamic coupling device with said source of fluid, a restriction in the fluid conduit to the hydrodynamic coupling device, and valve means under the control on said first-named valve means for at times by-passing said restriction so that the restriction is effective for limiting the pressure in the hydrodynamic coupling device to approximately the same pressure at the high pressure of said fluid source as with the low pressure of the fluid source when the restriction is by-passed.

8. In a transmission, the combination of a drive shaft, a driven shaft, a hydrodynamic coupling device driven by said drive shaft and having a fluid inlet, means for completing first and second power trains between said hydrodynamic device and said driven shaft, each of said two last-named means including a fluid pressure engaged friction engaging mechanism for completing the respective power train and the friction mechanism for the second power train requiring a higher pressure than the other friction mechanism, a source of fluid pressure, valve means for selectively connecting said pressure source with said friction engaging mechanisms, means for maintaining said fluid pressure source at a relatively low pressure for said first power train, means for maintaining said fluid pressure source at a relatively high pressure for said second power train, means for connecting said inlet of said hydrodynamic device with said pressure source and for circulating fluid therefrom through the hydrodynamic device, a restriction in said fluid inlet to said hydrodynamic device, and valve means under the control of said first-named valve means for at times by-passing said restriction so that the restriction is effective to reduce the flow to said hydrodynamic device when said pressure source is at its high pressure and is by-passed when said fluid source is at its low pressure.

9. In a transmission, the combination of a drive shaft, a driven shaft, a hydrodynamic coupling device driven by said drive shaft, means for providing a forward drive power train between said shafts, means for providing a reverse drive power train between said shafts, each of said two last-named means including a fluid pressure operated friction engaging device for completing the respective power train, a source of fluid pressure connectible with either of said friction engaging devices for engaging the devices, means for maintaining said fluid pressure source at a relatively low pressure for completing said forward drive power train, means for maintaining said fluid pressure source at a relatively high pressure for completing said reverse drive power train, means including a fluid inlet to said hydrodynamic device connected with said pressure source for circulating said fluid through said hydrodynamic device, a restriction in said fluid inlet and a parallel relatively nonrestricted passage around said restriction in said inlet, and a piston hydraulically connected with the friction engaging device for said reverse drive power train for blocking said parallel passage when said last-named device is engaged for reducing the flow through said hydrodynamic device when said reverse drive power train is effective.

10. In a transmission, the combination of a drive shaft, a driven shaft, a hydrodynamic coupling device driven by said drive shaft, means for providing a low speed forward drive power train between said hydrodynamic device and said driven shaft, means for providing a reverse drive power train between said hydrodynamic device and said driven shaft, each of said means including a fluid pressure operated friction engaging device for completing the respective power train and the friction mechanism for the reverse power train requiring a higher pressure than the other friction mechanism, said hydrodynamic device including a bladed driving element and a bladed driven element within a fluid housing, a friction clutch for providing a forward drive power train between said shafts exclusive of said hydrodynamic device and including a fluid pressure operated piston for engaging said clutch within said fluid housing and acting against the fluid pressure in the housing for engaging the clutch, a source of fluid pressure, means for selectively connecting said friction engaging devices and said clutch piston with said pressure source, means for maintaining said pressure source at a relatively low pressure for the forward drives, means for maintaining said pressure source at a relatively high pressure for said reverse drive, means for circulating fluid from said pressure source through said hydrodynamic device and including an inlet conduit to said hydrodynamic device connected with said pressure source, a restriction in said inlet conduit and a relatively nonrestricted parallel passage around said restriction, a blocking piston for closing said parallel passage, means connecting said last-named piston and said clutch piston so that said parallel passage is closed when said direct drive clutch is engaged for reducing the fluid pressure in the hydrodynamic device when said clutch piston is operative, and means connecting said blocking piston with said friction device for said reverse drive power train to close said parallel passage and thus restrict the fluid flow through said hydrodynamic device under the high pressure from said fluid pressure source.

11. In a transmission, the combination of a drive shaft, a driven shaft, means for providing a forward drive power train between said shafts and including an engaging device for completing the power train, means for providing a reverse drive power train between said shafts and including an engaging device for completing said power train, a selector having a forward and a reverse position for causing engagement of the forward drive engaging device or the reverse drive engaging device respectively, means for retarding the release of said forward drive engaging device when said selector is moved into its reverse position, and means for retarding the release of said reverse drive engaging device when said selector is moved into its forward drive position.

12. In a transmission, the combination of a drive shaft, a driven shaft, means for providing a forward drive power train between said shafts and including a fluid pressure operated friction engaging device for completing the power train, means for providing a reverse drive power train between said shafts and including a fluid pressure operated friction engaging device for completing the train, a source of fluid pressure, a selector valve having a forward drive position for connecting said pressure source with said forward drive engaging device and for opening a drain for said reverse drive engaging device and having a reverse position for connecting said pressure source with said reverse drive engaging device and for opening a drain for said forward drive engaging device, and a restriction provided in said drain for said reverse drive engaging device and a restriction provided in said drain for said forward drive engaging device for retarding the disengagement of said reverse drive engaging device when said selector valve is moved into its forward drive position and for retarding the disengagement of said forward drive engaging device when said valve is moved into its reverse drive position.

13. In a transmission, the combination of a drive shaft, a driven shaft, means for providing a first power train between said shafts and including a fluid pressure engaged friction engaging device for completing the power train, means for providing a second power train between said shafts and including a second fluid pressure engaged friction engaging device for completing the power train, a source of fluid pressure, a selector valve having first and second positions in which it respectively connects said first and second friction engaging devices with said source of fluid pressure for engaging the devices and in which it provides a drain for said second and first friction engaging devices respectively for disengaging the devices, and a restriction provided in the said drain for each of said friction engaging devices for retarding its disengagement when said selector valve is moved to engage the other of said engaging devices.

14. In a transmission, the combination of a drive shaft, a driven shaft, means for providing a first power train between said shafts and including a fluid pressure operated friction engaging device for completing the train, means for providing a second power train between said shafts and including a fluid pressure operated friction engaging device for completing the train, a source of fluid pressure selectively connectible with said friction engaging devices and including a pump, a regulator valve for regulating the fluid pressure of said pressure source, a first piston effective on said regulator valve and connected with one of said friction engaging devices for causing the regulation of the fluid pressure of the source to a certain pressure for one of said power trains, and a second piston also effective on said regulator valve and connected with the other of said friction engaging devices for causing the regulation of the fluid pressure of said source at a different pressure for the other of said power trains.

15. In a transmission, the combination of a drive shaft, a driven shaft, means providing a first power train between said shafts and including a fluid pressure operated friction engaging device for completing the train, means providing a second power train between said shafts and including a second fluid pressure operated friction engaging device for completing the train, a source of fluid pressure selectively connectible with said friction engaging devices and including a pump, a regulator valve for regulating the pressure of said pressure source, a piston having a spring disposed between it and said regulator valve and connected with one of said friction engaging devices for causing said regulator valve to regulate the pressure source to a predetermined pressure for this power train, and a second piston slidably disposed in said first piston and effective to bear on said regulator valve and connected with said other friction engaging device for causing said regulator valve to regulate the pressure of said source to a higher pressure for the other power train.

16. In a transmission, the combination of a drive shaft, a driven shaft, means for providing a forward drive power train between said shafts and including a first friction engaging device for completing the power train, means for providing a reverse drive power train between said shafts and including a second friction engaging device for completing the reverse drive power train, a source of fluid pressure including a pump, a regulator valve for regulating the pressure of said source, a selector valve having forward and reverse drive positions for respectively selectively connecting either said first or said second friction engaging device with said pressure source, a piston connected with said first friction engaging device and effective on said regulator valve for regulating the pressure of said source to a predetermined low pressure for said first friction engaging device, and a second piston also effective on said regulator valve and connected with said pressure source by means of said selector valve in its reverse drive position along with said first piston for causing the regulation by said regulator valve of said pressure source at a higher pressure for said second friction engaging device.

17. In a transmission for an engine driven vehicle, the combination of a drive shaft adapted to be driven by the vehicle engine, a driven shaft, a hydrodynamic coupling device driven by said drive shaft, means for providing a forward drive power train between said hydrodynamic device and said driven shaft and including a fluid pressure operated friction engaging device for completing the forward power train, means for providing a reverse drive power train between said hydrodynamic device and said driven shaft and including a second friction engaging device for completing the reverse power train, a source of fluid pressure including a pump, a selector valve having a neutral position and a forward drive position for connecting said pressure source and said first friction engaging device and a reverse drive position for connecting said pressure source and said second friction engaging device, a regulator valve for regulating the fluid pressure of said source, a piston and a spring between said piston and said regulator valve for causing the regulator valve to regulate the pressure of said source to a predetermined low pressure when no fluid pressure is applied to said piston in the neutral position of said selector valve, means hydraulically connecting said piston with said selector valve so that pressure is applied to said piston in the forward drive position of said selector valve so that said regulator valve functions to maintain the pressure of said source at a predetermined intermediate pressure in the forward drive position of the selector valve for causing said first engaging device to be engaged with sufficient intensity for a completion of said forward drive between said hydrodynamic device and said driven shaft, a second piston also effective on said regulator valve, means hydraulically connecting said selector valve with both of said pistons in the reverse position of said selector valve for causing the regulator valve to regulate the pressure of said pressure source at a high predetermined pressure for application to said second friction engaging device for completing the reverse drive power train between said hydrodynamic device and said driven shaft, and means for delaying the application of pressure to said first-named piston when the selector valve is moved into its forward drive position from its neutral position so that said first engaging device is engaged initially on movement of the selector valve from neutral to forward drive position with the predetermined low pressure from said source which is sufficient for holding the engaging parts of said first friction engaging device from relative movement under the drag torque transmitted by said hydrodynamic device at idling speeds of the vehicle engine.

18. In a transmission, the combination of a drive shaft, a driven shaft, means for providing a first power train between said shafts and including a hydrodynamic coupling device having driving and driven bladed elements within a fluid housing, means for providing a second alternate power train between said shafts including a clutch and a fluid pressure operated clutch engaging piston in said housing and acting against fluid in the housing to engage the clutch, means for circulating fluid through said hydrodynamic device and including a supply conduit for supplying fluid to the hydrodynamic device and a discharge conduit through which fluid is discharged from the hydrodynamic device, means for maintaining the fluid in said housing at a predetermined high pressure when said first power train is completed and at a reduced pressure when said second power train is completed and including a first fluid flow restricting valve in said inlet conduit and a second fluid flow restricting valve in said discharge conduit, and means for applying the fluid pressure applied to said clutch engaging piston on both of said valves so as to restrict the fluid flow to a greater extent through said inlet conduit and to restrict the fluid flow to a less extent in said discharge conduit when fluid pressure is applied to said clutch engaging piston for engaging the clutch.

References Cited in the file of this patent

UNITED STATES PATENTS

| | | |
|---|---|---|
| 2,645,137 | Roche | July 14, 1953 |
| 2,667,085 | Ackerman | Jan. 26, 1954 |
| 2,691,940 | McFarland | Oct. 19, 1954 |